M. A. KRIKORIAN.
ROTARY ENGINE.
APPLICATION FILED DEC. 7, 1915.
1,212,649.
Patented Jan. 16, 1917.
5 SHEETS—SHEET 4.
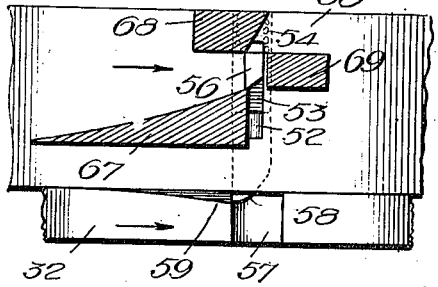
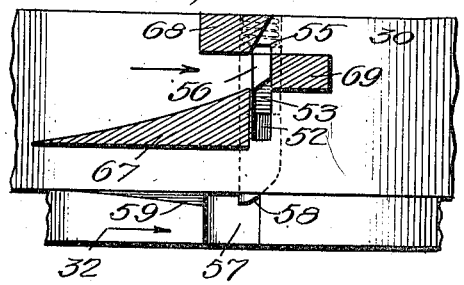
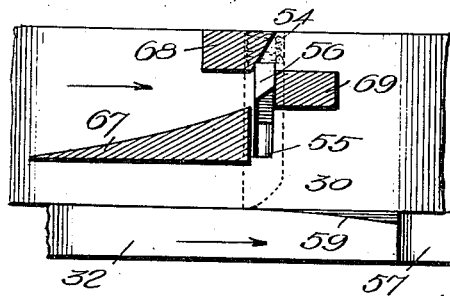
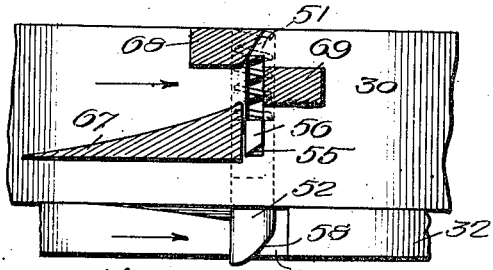
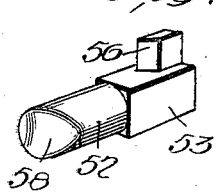
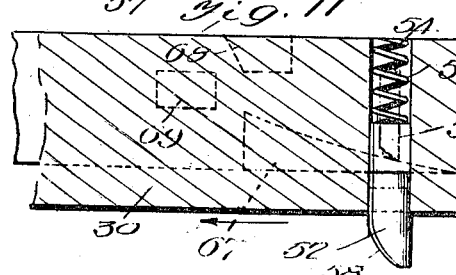
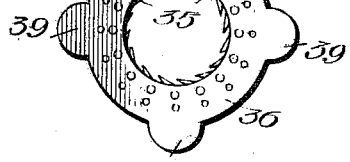
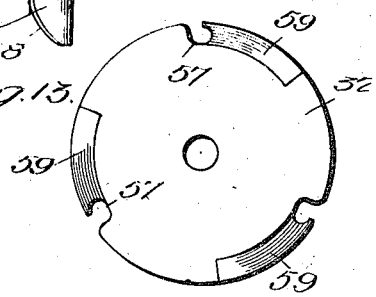
WITNESSES:
INVENTOR
MARDIROS A. KRIKORIAN
BY Munn & Co
ATTORNEYS

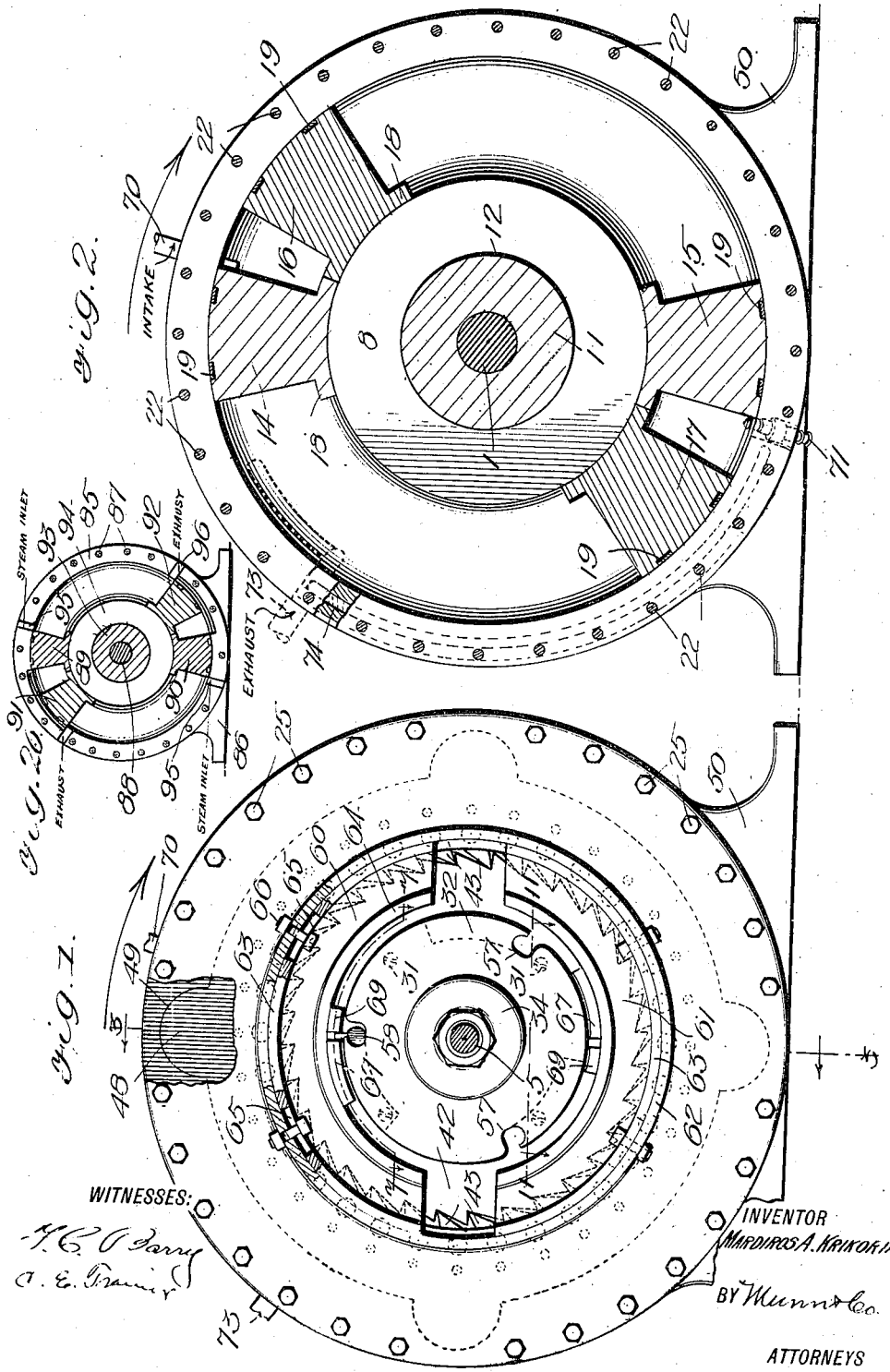

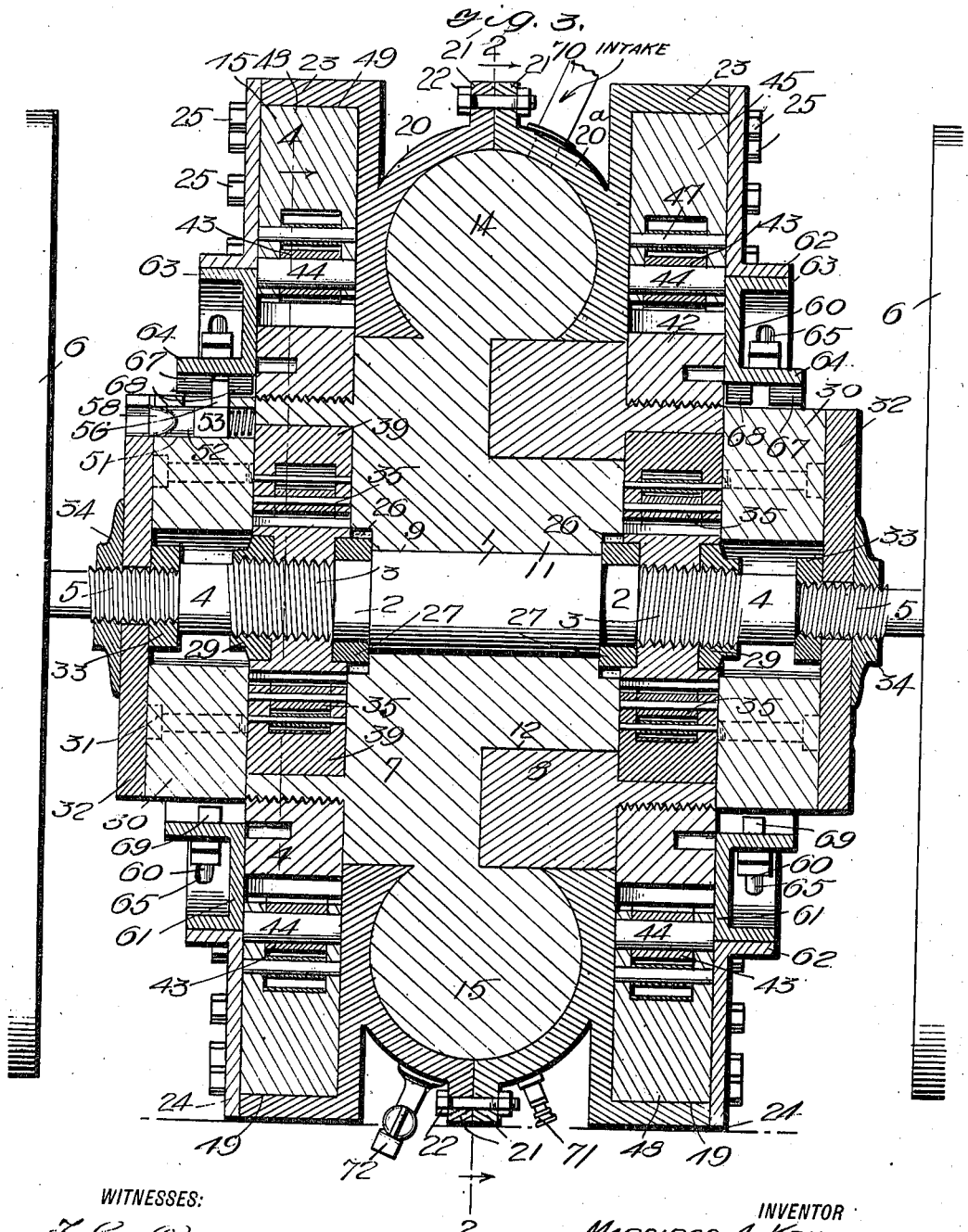

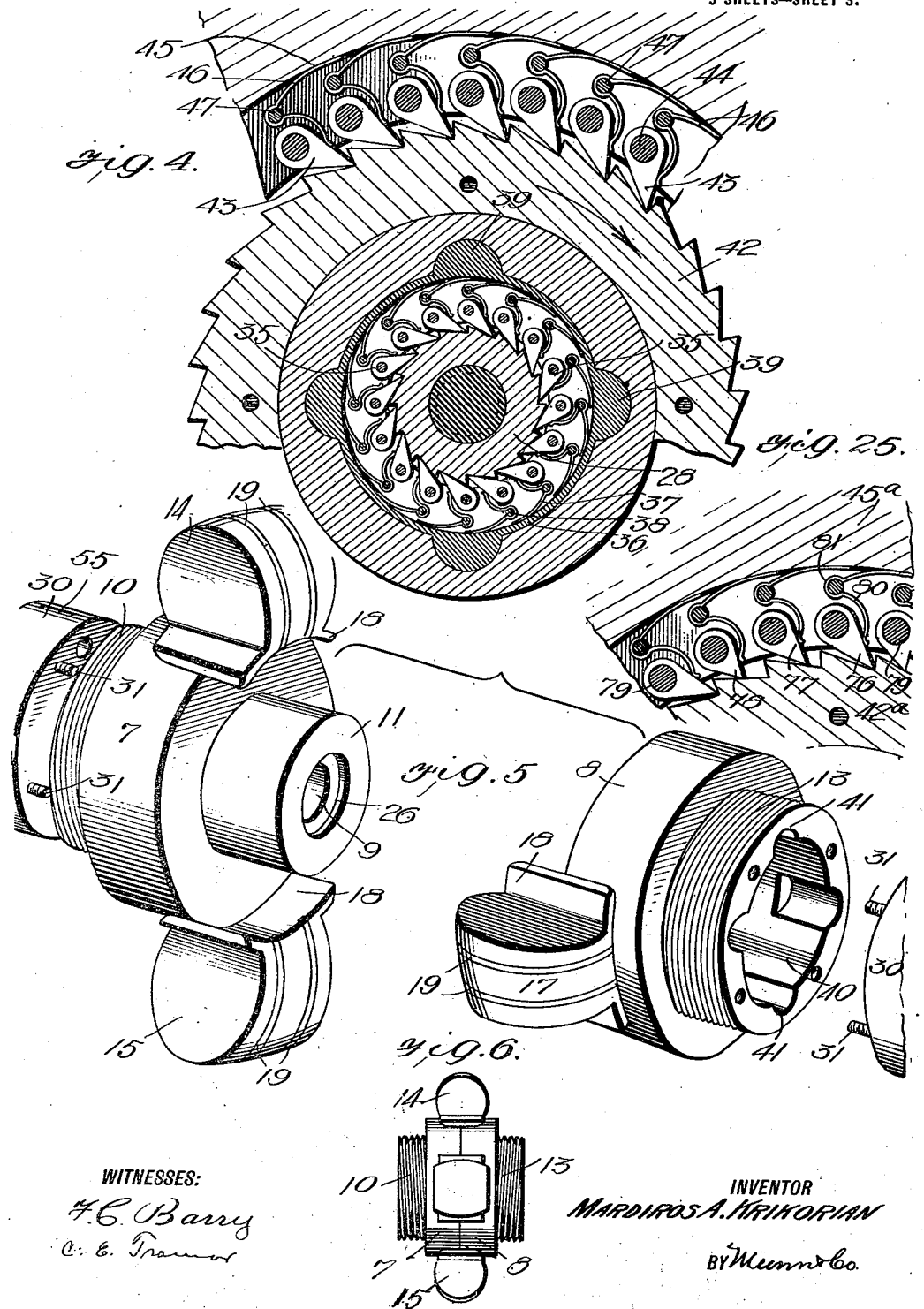

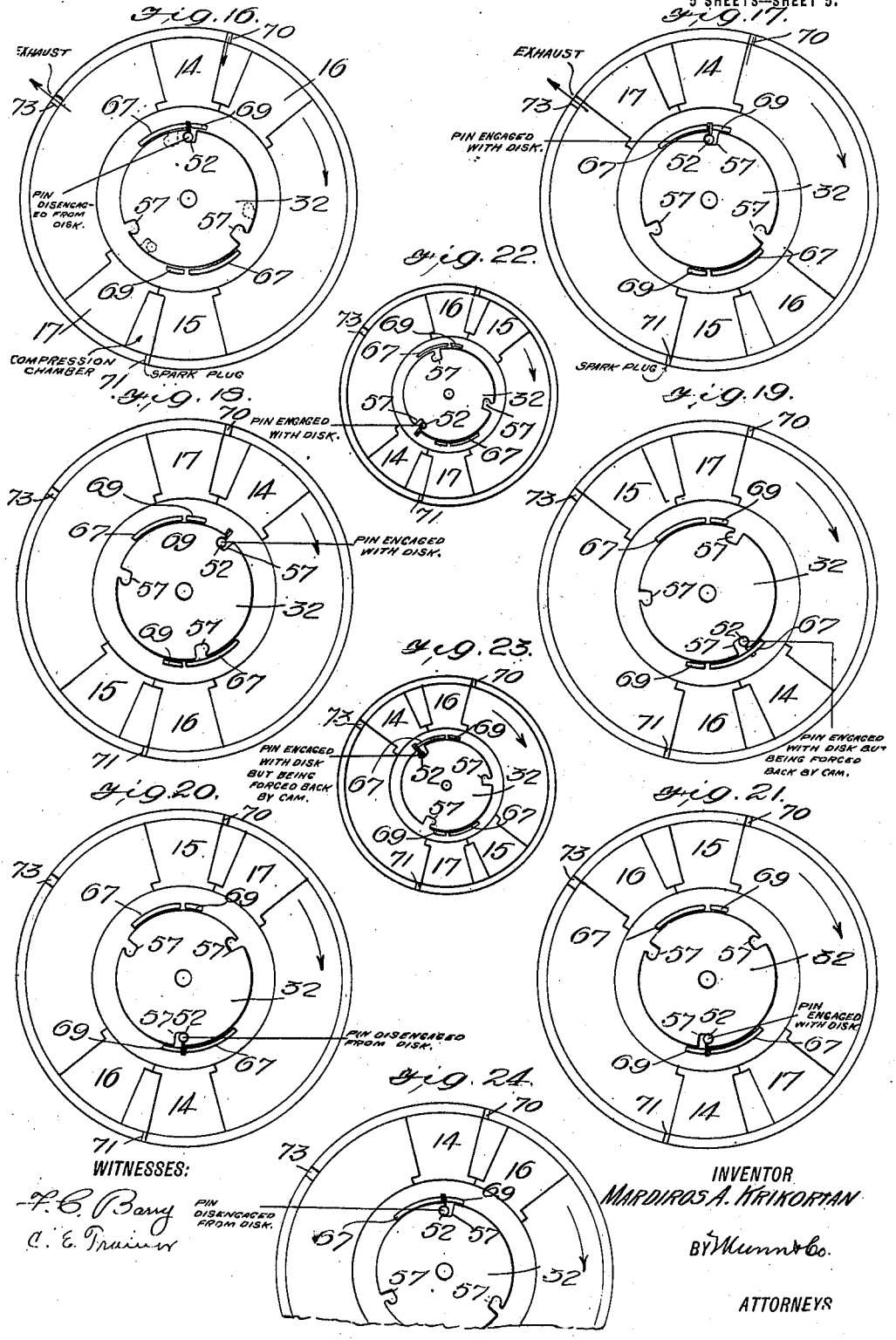

UNITED STATES PATENT OFFICE.

MARDIROS ASADOOR KRIKORIAN, OF NEW YORK, N. Y.

ROTARY ENGINE.

1,212,649.  Specification of Letters Patent.  Patented Jan. 16, 1917.

Application filed December 7, 1915. Serial No. 65,522.

*To all whom it may concern:*

Be it known that I, MARDIROS A. KRIKORIAN, a subject of the Ottoman Empire, and a resident of New York, in the county of New York and State of New York, have invented certain new and useful Improvements in Rotary Engines, of which the following is a specification.

My invention is an improvement in rotary engines, and the invention has for its object to provide an engine of the character specified, wherein a compound rotor is provided, consisting of similar sections, each having oppositely arranged vanes or abutments, and moving in a common passage and alternating with the vanes or abutments of the other section, and wherein the sections are connected to the driving shaft in such manner that when either rotor section moves forward, such forward motion will be imparted to the shaft, while at the same time the shaft actuated by one section may move forward freely through a fixed angle with respect to the other section and without interference from the said section, and wherein the vanes of the rotor sections act alternately as vanes against which the motive fluid may act to move the section forward, or as abutments against which the motive fluid may act to move the other section forward, and wherein means is provided operated by the movement of the sections for temporarily locking the sections in alternation from movement with respect to the casing.

In the drawings: Figure 1 is a side view of the engine with the shaft in section; Figs. 2 and 4 are sections on the lines 2—2 and 4—4, respectively, of Fig. 3, each looking in the direction of the arrows adjacent to the line; Fig. 3 is a section on the line 3—3 of Fig. 1, looking in the direction of the arrow adjacent to the line; Fig. 5 is a perspective view of the rotor with the parts detached; Fig. 6 is a front view of the rotor assembled;
Figs. 7, 8, 9 and 10 are circular sections taken substantially on the arc 7—7 of Fig. 1, and showing different positions of the parts; Fig. 11 is a section on the line 11—11 of Fig. 1; Fig. 12 is a perspective view of the latch pin; Fig. 13 is a front view of the cam disk; Fig. 14 is a similar view of the inner pawl carrying ring; Fig. 15 is a partial side view of the outer pawl carrying ring; Figs. 16 to 24 inclusive are diagrammatic views, showing the different stages in the movement of the motor; Fig. 25 is a detail sectional view, showing a modified type of pawl and ratchet connection, and Fig. 26 is a view similar to Fig. 2, showing a modified form of motor.

In the embodiment of the invention shown in Figs. 1 to 15 inclusive, a shaft is provided, having its central portion 1 cylindrical, and of uniform cross section, and at this point the compound rotor, to be later described, is arranged on the shaft. The shaft is annularly reduced at each end of the portion 1, as indicated at 2, and beyond each of the reduced portions the shaft has a threaded portion 3. Beyond each threaded portion 3 the shaft is again cylindrical, as indicated at 4, and beyond the cylindrical portion 4 at each end of the shaft there is a second reduced threaded portion 5. Beyond the portions 5 the shaft is plain, and fly wheels 6 are secured to the opposite ends of the shaft.

The compound rotor consists of sections 7, and 8, having the same external diameter, and the section 7 has a central bore or opening 9 fitting upon the portion 1 of the shaft. At one face the section 7 of the rotor is provided with an annularly coaxial rib or flange 10, and the said flange is externally threaded, as shown. At the opposite face the section 7 has a laterally extending hub 11, and the section 8 of the rotor has a central opening 12 of a size to receive the hub 11. The hub 8 is also provided with a laterally extending continuous coaxial rib or flange 13, corresponding to the flange 10 of the section 7, and externally threaded in the opposite direction to the threading of the flange 10. Each rotor section is provided with a pair of oppositely arranged radial vanes or abutments, the section 7 having vanes or abutments 14 and 15, while the section 8 has vanes or abutments 16 and 17.

It will be noted from an inspection of Fig. 5, that the vanes or abutments of each rotor section are so arranged with respect to the section, that when the section 8 is fitted over the hub 11 of the section 7, with its adjacent face in close contact with the adjacent face of the section 7, the four vanes or abutments 14, 15, 16 and 17 will be in register circumferentially of the rotor, that is, they will move in the same passage in the casing inclosing the rotor and to be later described.

Each of the vanes or abutments before mentioned is rounded or approximately cylindrical as shown, and each vane or abutment has a curved base 18 fitting the peripheral surface of the rotor section, and extending beyond the inner face of the section to which the vane or abutment is connected half the width of the base. Thus the base of each abutment has half of its concave surface connected to the peripheral surface of a rotor section and the other half of the base fits and rests upon the peripheral surface of the other section 8. Each abutment is provided with piston or packing rings 19 on its peripheral surface, for making a fluid tight joint between the pane or abutment and the casing to be later described.

The casing consists of two symmetrical sections 20 and 20$^a$, and the sections have abutting radial flanges 21 at their inner edges, which are connected by bolts and nuts 22 passing through registering openings in the flanges. The inner surface of those portions of the casing sections at the compound rotor proper are shaped to fit the peripheral surface of the abutments, and the peripheral surface of the rotor sections, as shown in Fig. 3, and beyond the outside of these portions each section 20 and 20$^a$ has a cylindrical portion 23, and these cylindrical portions are closed by housing rings 24, which are secured to the edges of the portions 23 by means of screw bolts 25.

The opposite ends of the hub 11 of the rotor section 7 are counter-bored, as shown at 26, for receiving rings 27, which fit within the counter-bored portions, and on the reduced portions 2 of the shaft. A ratchet wheel 28 is threaded onto each of the threaded portions 3 adjacent to the adjacent collar 27, and a washer 29 is threaded onto the threaded portion 3, which is engaged by the ratchet wheel, outside of the ratchet wheel, to hold the adjacent ratchet wheel in fixed position on the shaft.

The ends of the ratchet wheels are counter-bored, as shown in Fig. 3, to receive the collar 27 and the nut 29. A locking pin supporting disk 30 is arranged at each end of the shaft and abutting the outer face of the adjacent rib 10 or 13, as the case may be, and these disks 30 are secured to the ribs or flanges 10 and 13, by means of screw bolts indicated at 31. These bolts extend through the disks 30, and engage threaded openings in the flanges 10 and 13, respectively. A cam disk 32 is mounted on the shaft outside of each of the disks 30, and each cam disk 32 is locked to the shaft, by means of a nut 33 at the inner face of the disk, and a nut 34 at the outer face, and the said nuts 33 and 34 are threaded onto the threaded portions 5 of the shaft. Each nut 33 at its inner face abuts against the annular shoulder formed between the portions 4 and 5 of the shaft, and while the disks 32 are loose on the shaft that is, the said disks have no threaded engagement with the shaft, they are yet tightly locked to the shaft by the nuts 33 and 34.

The compound rotor is journaled loosely on the shaft, but is held from longitudinal movement by the collars 27. Mechanism is, however, provided for connecting the rotor to the shaft when the rotor moves forwardly under conditions to be later described. The said mechanism comprises in part the ratchet wheel 28, and each ratchet wheel 28 is engaged by an annularly arranged series of pawls 35. These pawls 35 are pivoted within a pawl carrying ring or casing 36, and each pawl is normally pressed toward the teeth of the ratchet wheel by a spring 37. Each of the springs 37 consists of two portions extending at an acute angle with respect to each other, and each spring is pivoted to the pawl carrying ring or casing at the junction of the portions by means of a pin 38.

One of the portions of each spring engages the adjacent pawl to press it toward the ratchet wheel, and the other portion engages one face of the pawl carrying ring or casing, as shown in Fig. 4. This ring or casing 36 is channel-shaped, the channel facing inwardly, and the said ring or casing is provided on its peripheral surface with rounded extensions 39. Each pawl carrying ring or casing is received within the adjacent rib 10, or 13, as the case may be, being held within the rib between the adjacent face of the adjacent motor section 7 or 8 and the adjacent disk 30.

The inner surface 40 of each flange 10 and 13 fits the pawl carrying ring or casing, and recesses 41 are provided in each rib or flange within which the extensions 39 engage and fill, and the pawl carrying rings are thus prevented from angular movement with respect to the flanges 10 and 13. A ratchet ring 42 is mounted on each of the ribs 10 and 13, each of the said ratchet rings being threaded onto the peripheral surface of the rib, and the teeth of each ratchet ring 42 are engaged by pawls 43, pivoted at 44 in a second pawl carrying ring or casing 45 similar to the ring 36.

Each of the rings or casings 45 is channel-shaped, the channel being inward, and the pawls being in the channel, and the pawls are pressed toward the teeth of the ratchet ring 42 by means of springs 46. These springs are similar to the springs 37 and similarly arranged, each being mounted on a pivot pin 47 in the channel of the pawl carrying ring or casing.

Each of the pawl carrying rings or casings 45 has the rounded extensions 48 on its peripheral surface, corresponding in position and arrangement to the extensions 39, and the said extensions are received within similarly shaped recesses 49 in the portions 23 of the casings. Thus the pawl carrying rings 45 are held from angular movement with respect to the casing sections, and since the said casing sections are fixed, the pawl carrying rings 45—45 are also fixed.

It will be noted from an inspection of Figs. 1 and 2 that the casing sections 20 and 20ᵃ, or rather the portions 23 of the said sections, have supporting feet 50 which provide a base for the motor.

It will be evident from the above description, that when the ratchet rings 42 are moved forwardly, the pawls 43 will prevent reverse movement of the pawl rings 36—35 and ratchet rings 42—42. These rings are as before stated rigid with the rotor ribs 10 and 13, and when the rotor moves forwardly, the ribs 10 and 13 move therewith, and will carry forward the pawl carrying rings or casings 36, which in turn will drive the ratchet wheels 28 which are rigid with the shaft.

Whenever either motor section 7 or 8 moves forwardly, the shaft will also move forwardly, but because of the pawl and ratchet connection, either motor section may be moved forwardly, without affecting the other section, that is, the motor sections are movable independently of each other, and the vanes of one section act as abutments during the movement of the vanes of the other section. The vanes of each section are alternately vanes upon which the motive fluid acts to drive the motor, and abutments against which the motive fluid acts to drive the other section forward.

In order that the vanes of each section may serve as fixed abutments, during the forward movement of the other section, some means must be provided for temporarily and releasably locking the motor sections in turn. This mechanism is carried by the disks 30. Each of the disks 30 is provided with a transverse recess 51, in which is arranged a pin 52, the pin having a portion 53 polygonal in cross section, which fits the similarly shaped recess 51, before mentioned.

A coil spring 54 is arranged between the inner end of each of the pins and the adjacent face of the adjacent rib 10 or 13, as the case may be, and each of the said springs 54 normally acts to press the pin outwardly beyond the face of the adjacent disk 30. The recess 51 of each disk 30 is near the peripheral surface, and a slot 55 leads from each recess 51 to the periphery of the disk.

The portion 53 of each pin 52 has a laterally extending lug 56, which engages and passes through the adjacent slot 55. The pins 52 are adapted to coöperate with radial notches 57 in the peripheries of the disks 32, before mentioned, and the engaging end of the pin is beveled as shown at 58. The notches 57 of the cam disks 32 have one wall undercut, as shown in Fig. 13, and the inner face of the disk is provided with a beveled or inclined surface 59, leading to the undercut walls of the notch or recess. These surfaces 59 are cam surfaces for normally pressing the pin inward, and the notches 57 are arranged at angles of 120° with respect to each other.

Cam carrying segments 60 and 61, respectively, are connected with each of the housing rings 24 before mentioned. Each of the said housing rings 24 is provided at its inner edge with a lateral outwardly extending flange 62, and the cam segments 60 and 61 are connected to this flange. Each of the said segments has a flange 63 at its convex edge, and a flange 64 at its concave edge, the said flanges being integral with the body of the segment. The flange 63 of each segment has circumferentially extending slots 65, and these slots 65 are adapted to register with openings in the flange 62 of the housing rings. Bolts and nuts 66 are provided for connecting the flanges, the bolts being passed through the slots of the flange 63 and through the openings in the flange 62, and being engaged by the nuts outside of the flange 62.

It will be evident that by loosening the nuts the cam segments may be shifted angularly. These cam segments carry on the inner face of the flange 64 two cam members, and the cam members 67 and 68 are spaced apart from each other slightly, and a stop 69 is arranged in alinement with the space between the cams, but the said stop is spaced apart from the adjacent faces of the cams.

Referring to Figs. 7 to 10, inclusive, it will be noticed that that face of the cam 67 which is adjacent to the cam 68 is a long incline, for engagement by the adjacent face of the projection 56, to gradually move the said projection inward, to withdraw the pin in the recess 51. The stop 69 is arranged at the end of the highest portion of the inclined surface of the cam 67, and in position to engage the projection 56, just after the said projection has passed out of engagement with the inclined surface of the cam 67.

The cam 68 has an inclined surface for engagement by the projection 56 of the pin 52, to move the said projection, the pin and the disk 30 past the end of the cam 67 which is adjacent to the stop 69, and to move the said projection into engagement with the said stop. As soon as the projection 56 is moved by the inclined surface of the cam 68 into contact with the stop 69, the lug or extension 56 of the pin is freed from the cam 67, to permit the spring 54 to expand, to project the pin, as shown in Figs. 9 and 10.

Thus, in practice, it may happen that after the pin 52 is disengaged from the disk 32, the rotor section may not have enough momentum to carry the projection 56 forward against the stop 69, so that the said projection may clear the forward end of the cam piece 67. This may happen in case of cranking the engine very slowly by hand, so that after the pin is disengaged from the disk by the action of the cam 67, and assumes the position shown in Fig. 7, the projection 56 may never assume the position shown in Fig. 8, unless the wall of groove 59 of disk 32 and cam piece 68 come into operation. In this case, however, the operation is as follows: After the pin 52 disengages from the disk 32 in the position shown in Fig. 7 and, as assumed above, the rotor section does not move any farther, then, as driving disk 32 rotates on, the wall of groove 59 will press against the pin 52. This will cause the projection 56 to slide along the inclined surface of the cam 68 which, being stationary, will cause the projection 56 to move a little forward and clear the forward edge of the cam piece 67 as plainly seen by a comparison of Figs. 7 and 8. The motion of the projection 56 along the inclined surface of cam piece 68, forces a further slight forward movement of the rotor section, and hence clears the projection 56 from the cam piece 67. Thus the pin 52 will assume the position shown in Fig. 8, permitting its free movement into the next slot when the disk 32 rotates and assumes the position shown in Fig. 9. It must be noted that the cam 68 will only come into operation when the rotor section, carrying the latch pin in question, lacks sufficient momentum at the moment when the pin 52 is disengaged from the disk 32.

It will be noticed from an inspection of Figs. 2 and 3, that the casing section 20ª has an intake or inlet port 70, for the motive fluid. Directly opposite the intake 70 is a spark plug 71 for igniting the charge, and at the spark plug a compression relieving cock 72 is provided in the section 20. The casing is also provided with an exhaust or outlet port 73, and the said port is in the form of a circumferential passage, as shown in Fig. 2. That portion of the casing or stator between the spark plug 71 and the exhaust 73 is water-jacketed, as shown at 74, to permit the circulation of a cooling fluid to cool that portion of the casing which is subjected to the heat of explosion. The spark plug 71 is arranged to spark continuously.

With the parts in the position of Fig. 2 and Fig. 16, the ignition will take place at the spark plug 71, and since the section 7 of the rotor is fixed, the explosion will act upon the vanes 16 and 17 of the section 8 of the rotor and will drive the said vanes in the direction indicated by the arrows in Figs. 16 to 24. The vanes 14 and 15 of the section 7 meanwhile act as abutments to receive the reaction of the charge.

As the section 8 moves forwardly, as soon as the vane 17 has reached the adjacent end of the exhaust passage the charge will begin to exhaust, but the rotor section will be driven ahead until the edges of the bases 18 of the vanes 16 and 17 engage the edges of the bases 18 of the vanes 14 and 15, as shown in Fig. 17.

When the vane 16 moves toward the vane 15, from the position of Fig. 2, a charge will be drawn into the casing, between the vanes 14 and 16, and a charge previously drawn between 16 and 15 will be compressed, the vanes assuming the position shown in Fig. 17.

When the momentum imparted to the fly wheel has moved the vanes into the position of Fig. 18, the compressed charge between 15 and 16 will be ignited at the position shown in Fig. 18, and the rotor vanes 16 and 17 will be moved, the vanes 16 and 17 serving as abutments to receive the reaction of the charge. It will be noted that the rotor and the shaft have moved simultaneously from the position of Fig. 17 to that of Fig. 18. The rotor section 15, and also 14, since they are rigid, will move under the stress of the exploding gases to the position of Fig. 19. In so doing the vane 14 will suck in a charge between 17 and 14. It will also compress the charge previously sucked between 14 and 16, while at the same time the vane upon which the explosion acted will sweep out the gases which at the previous explosion were left between 17 and 15. The momentum, however, will carry the rotor sections to the position of Fig. 20, and that charge drawn in by the movement of the vane 16 and compressed by the movement of the vane 14 as shown in Fig. 19, will now be ignited.

When the charge is exploded the vane 16 will move past the exhaust, as shown in Fig. 21, and the vane 17 moving toward the vane 14, will draw in a charge between the vanes 17 and 15, and will compress the charge drawn by 19. The vane 16 will sweep out the gases left between 16 and 15. The momentum will carry the rotor section forward, from the position of Fig. 21 to that of Fig. 22, and the charge between the vanes 14 and 17 will be ignited. The rotor section 7 will move under the influence of the exploded charge, until the vane 14 passes the exhaust. The momentum, however, will carry the parts forward from the position of Fig. 23, to that of Fig. 24, and another charge, namely that between the vanes 15 and 17 under compression will be ignited. The vanes of each piston section are alternately vanes moving under the stress of the exploding gases and serving as abutments against which the force of the explosion acts to move the other section forwardly.

In operation, with the parts in the position of Fig. 16, the vanes 14 and 15 are abutments coöperating with the vanes 16 and 17, to form a suction chamber and an explosion chamber. The rotor section 7 has been stopped in the position shown in Fig. 16, by the engagement of its pin 52 with the adjacent stop 69, and the position of the pin at this moment is as shown in Fig. 7.

During the forward movement of each rotor section, that is, during the movement of the said section under the influence of the exploding charge, the said section is connected to the shaft to constrain the shaft to rotate therewith, by the pawl and ratchet connection. When the shaft moves forwardly under the influence of the forward movement of the section 7, the shaft may move freely forwardly with respect to the section 8, which at this moment, that is, during the forward movement of the section 7, under the influence of the gas, is at rest in the position of Fig. 16.

To carry the rotor sections from the position of Fig. 17 to the position of Fig. 18, the momentum of the shaft 1 and its fly wheels is utilized. As soon as the vane, 17 passes the exhaust opening 73, the vane 17 and the rotor section 7 are no longer acted upon by the exploding charge, since the said charge has commenced to exhaust. The rotor section 8 must, however, move to the position shown in Fig. 18, before the said section will have its vanes 16 and 17 in position to receive the reaction of the next explosion, and the momentum of the shaft 1 and the fly wheels 6 is utilized for this further movement, and it will be evident that some mechanism must be provided to connect the rotor sections to the shaft in such manner that the forward movement of the shaft will be imparted to the said sections to move them from the position of Fig. 17 to that of Fig. 18, since it will be evident that the pawl and ratchet connection between the rotor section and the shaft will not serve.

The mechanism relied upon to connect the shaft with the rotor section to cause them to move forwardly with the shaft is the pin 52 and coöperating parts. At the moment when each rotor section comes into the vertical position of Fig. 16, that is, in the abutment position, the pin 52 relating to the said section must be released from the cam disk 32, for the reason that the shaft is again moved forward under the influence of the exploding charge acting on the other rotor section 8, and were the section 7 connected to the shaft by its pin 52 they would have met the stop 69 and either the stop or the projection 56 would be broken, or if they were strong enough to destroy the momentum of the shaft and fly wheel the engine would stop, since the relative positions of the two rotor sections would remain the same, the said section would be moved forwardly with the vane 16. Hence when either section is in the position of the section 7 in Fig. 16, the pin 52 of the said section is released from the cam disk 32, by the fixed cam piece 64.

When now the exploding charge drives the vane 17 of the section 8 to the position of Fig. 17, the movement of the shaft does not affect the rotor section 7, which remains at rest, and its vanes act as abutments. To move the rotor from the position of Fig. 17 to that of Fig. 18, since the momentum of the shaft and its fly wheels is relied upon, the section 7 must be connected with the shaft, to participate in this forward movement. The section 8 is already connected with the shaft and remains connected until its vanes reach the position of Fig. 18, at which moment the pin is disengaged. On the succeeding explosion, it is the rotor section 7 that is moved by the exploding charge, and the vane 15 will be driven to the position of Fig. 19 under the influence of the charge.

In Fig. 16 the position of the rotor sections is shown at the moment when the compressed and ignited charge is allowed to expand, since the compressed gas ignites before the rotor assumes the position of Fig. 16 from that of Fig. 23, but it cannot drive away the vane 17 until the pin 52 of the rotor section 7 disengages from the disk 32. At that moment the section 8 is free from section 7 which is in no way connected to the shaft.

Under the influence of the exploding charge, the sections are moved to the position of Fig. 17, and under the momentum of the shaft they will move to the position of Fig. 18. When the charge between the vanes 15 and 16 is ignited, the section 7 is moved to the position of Fig. 19, and the momentum of the fly wheels carries the sections from the position of Fig. 19 to that of Fig. 20. In Fig. 21, the rotor section 8 has moved from the position of Fig. 20 under the influence of the exploding charge, and from the position of Fig. 21 to that of Fig. 22, the momentum of the fly wheels and shaft moves the rotor sections. From the position of Fig. 22 to that of Fig. 23 the section 7 is moved by the exploding charge, and from the position of Fig. 23 to that of Fig. 24, the sections are moved by the momentum of the fly wheels. In Fig. 16, the pin 52 is just disengaged from the disk 32, and the projection of the said pin has engaged the stop 69 to check the movement of the rotor section 7. In Fig. 17 the pin is engaged with the disk in order that the momentum may carry both sections to the position of Fig 18. Whenever either section is moved under the influence of the exploding charge, the pin 52 of that section is in engagement with the disk 32.

Whenever the vanes of a rotor section act as abutments, the said section is freed from the adjacent disk 32, while when either section is moving under the influence of the exploding charge, the said section is connected to the disk 32.

The sequence of operation is clearly shown in Figs. 16 to 24. When the vanes of either rotor section are in vertical position shown in Figs. 16, 20 and 24 for the rotor 7, and in Figs. 18 and 22 for the rotor 8, the said section is released from the adjacent cam disk. When the vanes of either section occupy the position of the section 7 in Fig. 16, the said section is disconnected from the cam disk, but becomes connected as the movement induced by the momentum commences, and as soon as the other rotor section reaches the position of Fig. 17, the pin is in engagement with the disk.

It will be noted that the notches or recesses 57 of the cam disks are spaced at angular intervals of 120°. This is approximately the distance traveled by either section under the influence of the exploding charge.

In Fig. 25 is shown a modified construction of pawl and ratchet mechanism. In this view the ratchet ring 42ª, corresponding to the ring 42, is engaged by pawls mounted in the pawl carrier 45ª, and corresponding to the carrier 45 of Fig. 1. Three series of pawls are provided, a long series 76, an intermediate series 77 and a short series 78. The pawls are mounted on pivot pins 79, and they are pressed toward the teeth of the gear ring by springs 80, corresponding in shape and arrangement to the springs 46 of Fig. 4, and supported by pins 81 in the pawl carrier. Referring to Fig. 25, it will be seen that the series are so related to each other, that when the pawl of the long series 76 engages a tooth, the pawl 77 will be spaced from a tooth one-third of the distance between the two teeth, and the pawl 78 of the short series will be at about midway between two teeth. The pawls are arranged in regular recurring series, first a long pawl, then an intermediate pawl, and lastly a short pawl. With this arrangement there will always be a series of pawls in engagement with the teeth, and the clacking noise of pawl and ratchet mechanism will be eliminated.

In Fig. 26 is shown an engine especially adapted for the use of steam as the motive fluid. This section comprises a stator consisting of a sectional casing, the sections 85 of the casing having supporting bases 86, and being connected by bolts and nuts 87. The vanes 89, 90, 91 and 92 of the rotor sections 93, and 94 move in the annular passage of the casing in the same manner as the vanes 14, 15, 16 and 17 of Figs. 1 and 2. It will be understood that the sections are connected to the shaft in the same manner as the sections of Figs. 1 and 2, and that the pin and cam disk mechanism is the same as in the said figures. The casing is provided with two steam inlet passages 95 at diametrically opposite points, and with exhausts 96 also arranged at opposite points. When the steam is admitted at an inlet 95, one of the sections is driven forward, until the exhaust passage adjacent to the inlet is reached. The momentum of the shaft will carry both sections from the exhaust to the position of the section 94 in Fig. 25, when the motive fluid will again come into action. With this construction, however, the motive fluid acts simultaneously on the two vanes of the sections in alinement, the vanes of the other sections both serving as abutments. The operation is precisely the same as in the construction shown in Figs. 1 and 2. In both constructions, the rotor sections are connected to the shaft first by the pawl and ratchet connection, which constrains the shaft to move forward with the sections, but permits the sections to move rearward with respect to the shaft independently of the shaft. Each section is also connected to the shaft by the pin and cam disk arrangement, in such manner that when the pin is in operative position, the rotor section to which the pin pertains must move forward with the shaft, while the shaft may move rearward with respect to the other section. This connection is broken at predetermined points in the travel of the sections by the cam mechanism supported by the frame, and controlled by the movement of the sections.

I claim:

1. A rotary engine, comprising a stator consisting of a casing having an annular passage, a shaft journaled in the casing at the axis of the passage, a sectional rotor, each section of the rotor being journaled loosely on the shaft and having a pair of oppositely extending blades moving in the passage, the blades of one section alternating with the blades of the other section, a driving connection between each section of the rotor and the shaft for constraining the shaft to move forwardly with the rotor section and to permit the shaft to move forwardly independent of the rotor section, the blades of the section serving alternately as pistons upon which the motive fluid may act to drive the section forwardly, and as abutments for the motive fluid, a normally operative connection between each rotor section and the shaft for constraining the section to move forwardly with the shaft and for permitting the shaft to move forwardly independently of the section, said connection comprising a cam plate, a cam disk adjustably connected with the shaft adjacent to each rotor section, a pin mounted to move laterally in each rotor section, each disk having recesses in its periphery for engagement by the pin of the adjacent section, and a spring normally pressing each pin into engagement with the cam disk, and means in connection with the casing and adjustable with respect thereto for retracting the pins at predetermined points to release the sections from the shaft when the blades of the sections are in abutment position, each cam plate having means for engaging the pin of the section to check the movement of the section when the blades are in abutment position, said casing having an inlet for the motive fluid, and an igniting device opposite the said inlet, and having an exhaust between the spark plug and the inlet and adjacent to the inlet.

2. A rotary engine, comprising a stator consisting of a casing having an annular passage, a shaft journaled in the casing at the axis of the passage, a sectional rotor, each section of the rotor being journaled loosely on the shaft and having a pair of oppositely extending blades moving in the passage, the blades of one section alternating with the blade of the other section, a driving connection between each section of the rotor and the shaft for constraining the shaft to move forwardly with the rotor section and to permit the shaft to move forwardly independent of the rotor section, the blade of the sections serving alternately as pistons upon which the motive fluid may act to drive the section forwardly, and as abutments for the motive fluid, a normally operative connection between each rotor section and the shaft for constraining the section to move forwardly with the shaft and for permitting the shaft to move forwardly independently of the section, said connection comprising a cam disk adjustably connected with the shaft adjacent to each rotor section, a pin mounted to move laterally in each rotor section, each disk having recesses in its periphery for engagement by the pin of the adjacent section, and a spring normally pressing each pin into engagement with the cam disk, and means in connection with the casing and adjustable with respect thereto for retracting the pins at predetermined points to release the sections from the shaft when the blade of the sections are in abutment position, and having means for engaging the pins to check the sections in abutment position.

3. A rotary engine, comprising a stator consisting of a casing having an annular passage, a shaft journaled in the casing at the axis of the passage, a sectional rotor, each section of the rotor being journaled loosely on the shaft and having a pair of oppositely extending blades moving in the passage, the blades of one section alternating with the blades of the other section, a driving connection between each section of the rotor and the shaft for constraining the shaft to move forwardly with the rotor section and to permit the shaft to move forwardly independent of the rotor section, the blades of the section serving alternately as pistons upon which the motive fluid may act to drive the section forwardly, and as abutments for the motive fluid, a normally operative connection between each rotor section and the shaft for constraining the section to move forwardly with the shaft and for permitting the shaft to move forwardly independent of the section, and means controlled by the forward movement of the shaft for releasing the connection when the blades of the rotor sections are in abutment position.

4. A rotary engine, comprising a stator consisting of a casing having an annular passage, a shaft journaled in the casing at the axis of the passage, a sectional rotor, each section of the rotor being journaled loosely on the shaft and having a pair of oppositely extending blades moving in the passage, the blades of one section alternating with the blades of the other section, a driving connection between each section of the rotor and the shaft for constraining the shaft to move forwardly with the rotor section and to permit the shaft to move forwardly independently of the rotor section, the blades of the section serving alternately as pistons upon which the motive fluid may act to drive the section forwardly, and as abutments for the motive fluid, and means controlled by the relative forward movement of the shaft with respect to the rotor sections for connecting the said sections to the shaft at predetermined points in the travel of the sections.

5. A rotary engine, comprising a stator having an annular passage, a sectional rotor, each section having a pair of oppositely extending blades moving in the passage, and the blades of the sections alternating, a shaft upon which the sections are journaled, a driving connection between each rotor section and the shaft for constraining the shaft to move forward with the sections and for permitting the shaft to move forward independently of the sections, and means controlled by the relative movement forward of the shaft with respect to each rotor section for connecting the section to the shaft at predetermined points in the travel of the section, to constrain the section to move with the shaft.

6. A rotary engine comprising a casing having an annular passage, a sectional rotor, each section having radial blades moving in the passage, and the blades of one section alternating with the blades of the other section, a shaft on which the sections are journaled, a driving connection between each section and the shaft for constraining the shaft to move forward with the section and for permitting the shaft to move forward independently of the section, a normally operative connection between each section and the shaft for constraining the section to move forward with the shaft and for permitting the shaft to move forward independently of the section, and means controlled by the casing for releasing the said connection at predetermined points in the travel of the section, said releasing means being adjustable with respect to the casing.

7. A rotary engine comprising a casing having an annular passage, a sectional rotor, each section having radial blades moving in the passage, and the blades of one section alternating with the blades of the other section, a shaft on which the sections are journaled, a driving connection between each section and the shaft for constraining the shaft to move forward with the section and for permitting the shaft to move forward independently of the section, a normally operative connection between each section and the shaft for constraining the section to move forwardly with the shaft and for permitting the shaft to move forward independently of the section, and means controlled by the casing for releasing the said connection at predetermined points in the travel of the section.

MARDIROS ASADOOR KRIKORIAN.